(12) United States Patent
Snyder

(10) Patent No.: US 7,909,553 B2
(45) Date of Patent: Mar. 22, 2011

(54) CARGO BED STORAGE STRUCTURE FOR A VEHICLE

(75) Inventor: Mark D Snyder, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 327 days.

(21) Appl. No.: 12/332,412

(22) Filed: Dec. 11, 2008

(65) Prior Publication Data

US 2010/0148536 A1 Jun. 17, 2010

(51) Int. Cl.
*B60P 7/08* (2006.01)

(52) U.S. Cl. ........... 410/100; 410/97; 410/103; 410/109

(58) Field of Classification Search .................... 410/10, 410/11, 12, 23, 34, 96, 97, 100, 103, 102, 410/106, 116, 109, 112, 117, 118; 224/403, 224/534, 568; 248/499
See application file for complete search history.

(56) References Cited

U.S. PATENT DOCUMENTS

| | | | |
|---|---|---|---|
| 4,842,458 A | 6/1989 | Carpenter | |
| 5,282,706 A | 2/1994 | Anthony et al. | |
| 5,961,263 A * | 10/1999 | Nunez | 410/103 |
| 6,524,041 B1 | 2/2003 | Voiculescu | |
| 6,793,449 B1 | 9/2004 | Simpson et al. | |
| 7,281,889 B2 | 10/2007 | Anderson et al. | |
| 7,334,972 B2 | 2/2008 | Cash | |
| 2006/0188354 A1 | 8/2006 | Bosley | |

* cited by examiner

*Primary Examiner* — Stephen Gordon
(74) *Attorney, Agent, or Firm* — Global IP Counselors, LLP

(57) ABSTRACT

A cargo bed storage structure is provided for a vehicle. The cargo bed storage structure includes a cargo bed having a floor and a wall. The wall has a first portion extending substantially perpendicularly from the floor and a second portion extending inboard from the first portion. An attachment member is fixed to a lower surface of the second portion of the wall. A tie-down device has a first end that is fixed to the first portion of the wall. The tie-down device is operative in a stowed configuration and a usage configuration. The second end of the tie-down device is releasably engaged with the attachment member when the tie-down device is in the stowed configuration such that the tie-down device is disposed entirely outboard of an inboard distal end of the second portion of the wall.

13 Claims, 11 Drawing Sheets

CARGO BED STORAGE STRUCTURE FOR A VEHICLE

BACKGROUND OF THE INVENTION

1. Field of the Invention

The present invention generally relates to a cargo bed storage structure. More specifically, the present invention relates to a cargo bed storage structure having a tie-down that is disposed outside of a work area of the cargo bed.

2. Background Information

Pick-up trucks have increased in popularity in recent years. Some pick-up trucks are used primarily for work and others primarily for recreation. Many trucks do double-duty supporting both of these spheres of activity. Basically, a pick-up truck has a storage or cargo bed in which a tailgate is pivotally mounted to side walls of the cargo bed. Typically, a standard cargo bed of a pick-up is little more than a large empty volume with a few tie-down points scattered along the perimeter of the cargo bed. These tie-down points are usually hooks or rings that are fastened to the cargo bed. When securing individual objects in the bed, such as dirt bikes, ATVs, air tanks, furniture, and other items, a tether or rope is often used to secured the object to these tie-down points. Recently, the cargo area of the pick-up truck has been provided with tracks for adjustably mounting the tie-downs to the cargo bed. One example of a pick-up truck that has adjustable tie-down system is disclosed in U.S. Pat. No. 7,281,889 to Anderson et al. While this tie-down system works well, the tie-downs are located in areas that can obstruct full use of the cargo bed, unless the tie downs are removed.

In view of the above, it will be apparent to those skilled in the art from this disclosure that there exists a need for an improved cargo bed storage structure. This invention addresses this need in the art as well as other needs, which will become apparent to those skilled in the art from this disclosure.

SUMMARY OF THE INVENTION

One object of the present invention is to provide a cargo bed storage structure with at least one tie-down that is disposed outside of a work area of the cargo bed.

According to one aspect of the present invention, a cargo bed storage structure is provided for a vehicle. The cargo bed storage structure basically includes a cargo bed, an attachment member and a tie-down device. The cargo bed includes a floor and a wall. The wall has a first portion extending substantially perpendicularly from the floor and a second portion extending inboard from the first portion and defining a lower surface facing the floor. The attachment member is fixed to the lower surface of the second portion of the wall. The tie-down device has a first end and a second end. The first end is fixed to the first portion of the wall. The tie-down device is operative in a stowed configuration and a usage configuration. The second end of the tie-down device is releasably engaged with the attachment member when the tie-down device is in the stowed configuration such that the tie-down device is disposed entirely outboard of an inboard distal end of the second portion of the wall.

The above object and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
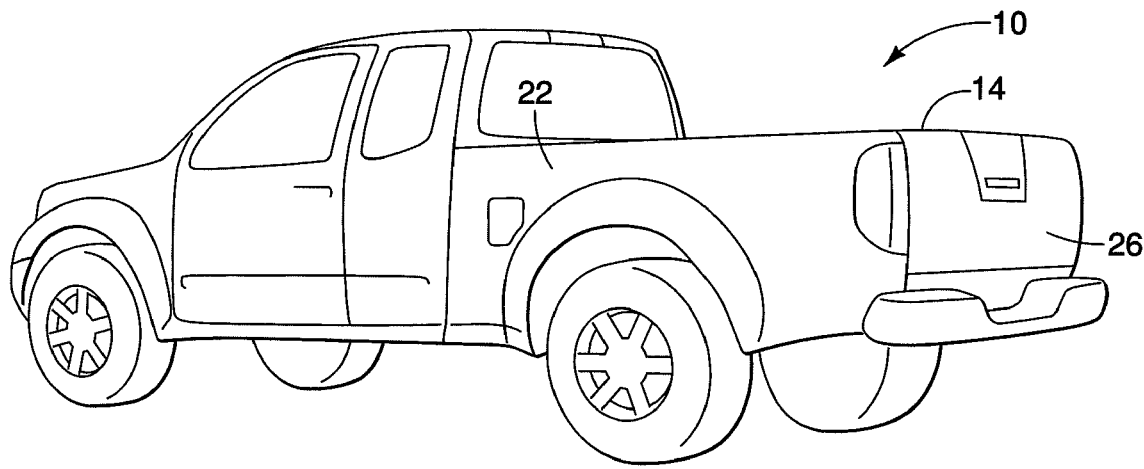
FIG. 1 is a driver side perspective view of a vehicle (pick-up truck) having a cargo bed storage structure in accordance with one embodiment.
Figure 2:
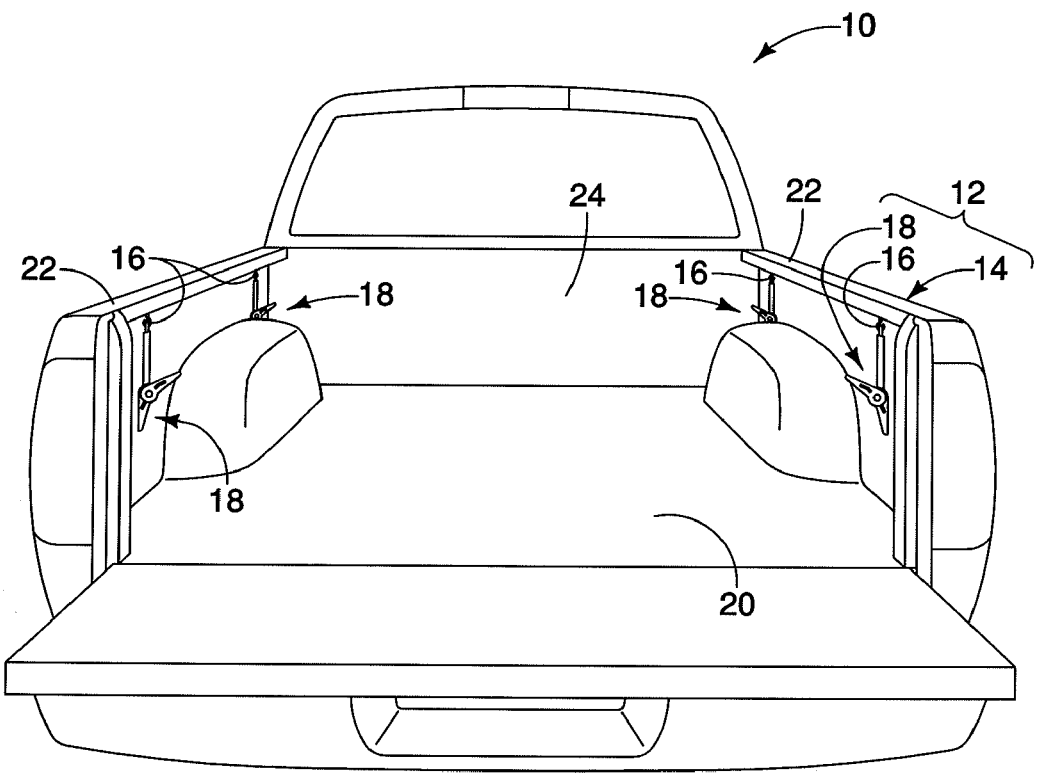
FIG. 2 is a rear end perspective view of the vehicle illustrated in FIG. 1 having the cargo bed storage structure.
Figure 3:
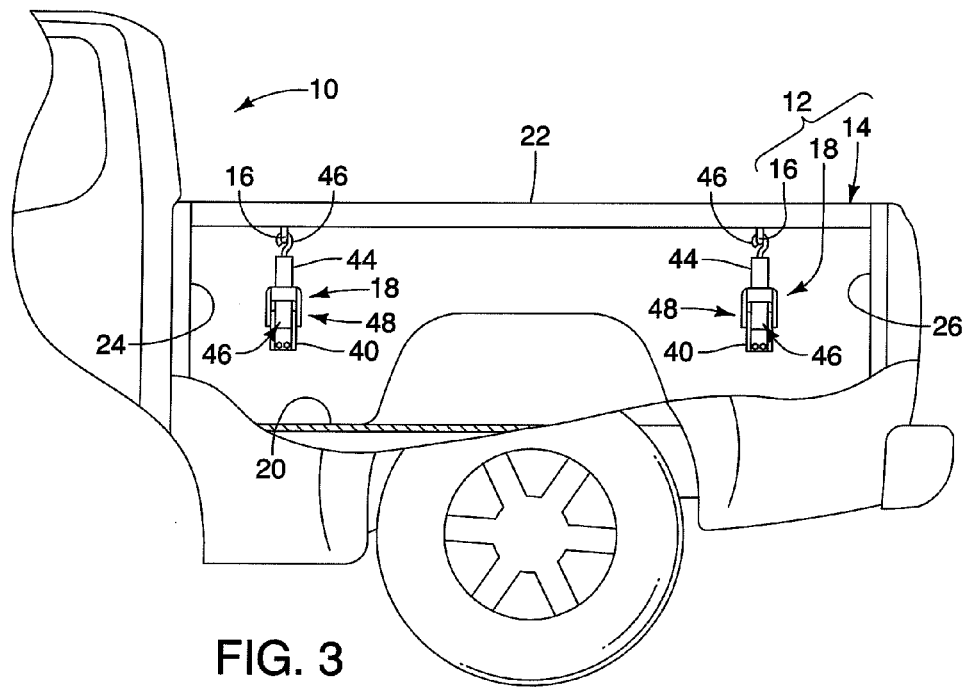
FIG. 3 is a side elevational view of the vehicle illustrated in FIGS. 1 and 2 with a portion of the truck bed broken away to show two of the retractable tie-downs of the cargo bed storage structure.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 4, a vehicle 10 is illustrated that includes a cargo bed storage structure 12 in accordance with a first embodiment. Basically, the cargo bed storage structure 12 includes a cargo bed 14, a plurality of attachment members 16 and a plurality of tie-down devices 18. In the illustrated embodiment, the cargo bed 14 is a pick-up truck bed. While the vehicle 10 is illustrated as a pick-up truck, it will be apparent to those skilled in the art from this disclosure that other types of vehicles such as sport utility trucks (SUTs) can also utilize the cargo bed storage structure 12 of the present invention.

Basically, the cargo bed 14 includes a floor 20, a pair of side walls 22, a front wall 24 and a tail gate 26. The side walls 22 and the front wall 24 are fixed to the floor 20, and extend generally in a vertical direction from the floor 20. The tail gate 26 is pivotally attached to the rear ends of the side walls 22 to move between a generally vertical position and a generally horizontal position. When the tail gate 26 is in the generally vertical position, the floor 20, the tail gate 26 and the walls 22 and 24 form a box with an open top. The floor 20, the tail gate 26 and the walls 22 and 24 are rigid structures that are typically made of sheet metal and that are typically welded together. Alternatively, the floor 20, the tail gate 26 and the walls 22 and 24 are constructed using resin panels or a combination of resin and sheet metal panels attached by fasteners with or without adhesive. Since the cargo bed 14 is generally conventional, the cargo bed 14 will not be discussed and/or illustrated in further detail, except as necessary to explain the cargo bed storage structure 12 of the present invention.

Figure 5:
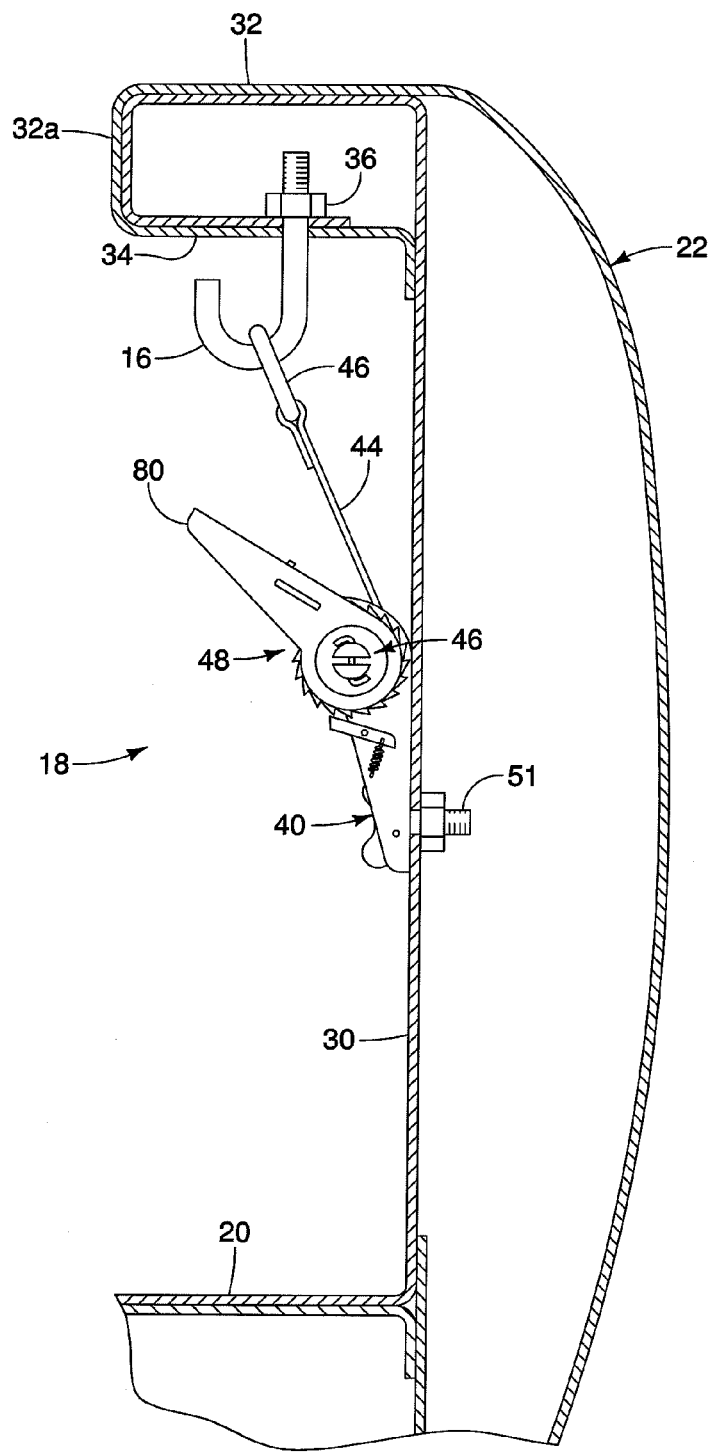
FIG. 5 is a partial cross-sectional view of the cargo bed storage structure as viewed along section line 5-5 of FIG. 4, showing one of the retractable tie-downs in the stowed configuration.

Referring now to FIG. 5, one of the side walls 22 is illustrated in cross section. Each of the side walls 22 has a first portion 30 extending substantially perpendicularly from the floor 20 and a second portion 32 extending inboard from the first portion 30. Each of the second portions 32 defines a lower surface 34 facing the floor 20. The attachment members 16 are fixed to the lower surfaces 34 of the second portions 32 of the side walls 22. In the illustrated embodiment, two of the attachment members 16 are fixed to each of the lower surfaces 34 of the side walls 22. Of course, it will be apparent to those skilled in the art from this disclosure that fewer or more of attachment members 16 can be fixed to the lower surfaces 34 of the side walls 22, as needed and/or desired.

Figure 15:
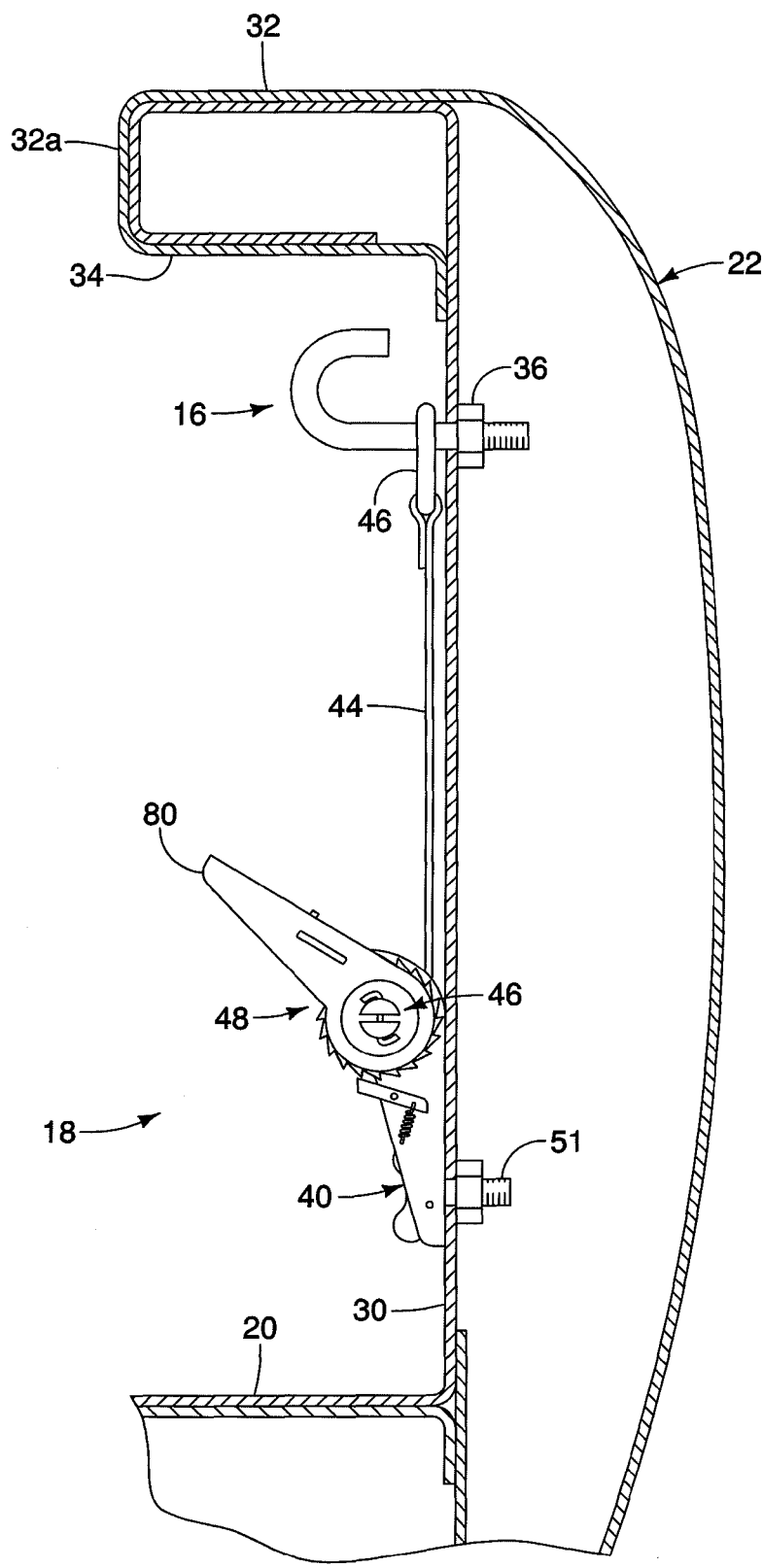
FIG. 15 is a partial cross-sectional view, similar to FIG. 5, of a cargo bed storage structure in accordance with yet another modified embodiment.

Still referring to FIG. 5, in the illustrated embodiment, the attachment members 16 are all identical. Thus, only one of the attachment members 16 will be discussed and or illustrated in detail herein. As mentioned above, the attachment members 16 are fixed to the lower surfaces 34 of the second portions 32 of the side walls 22. The attachment members 16 are disposed entirely outboard of inboard distal ends 32a of the second portions 32 of the side walls 22. In the illustrated embodiment, the attachment members 16 are rigid J-bolts that form hooks for stowing the tie-down devices 18 as discussed below. Thus, in this embodiment, the attachment members 16 are threaded into nuts 36 that are welded to the second portions 32 of the side walls 22. Alternatively, the attachment members 16 can be attached to upper areas of the first portions 30 of the side walls 22 as seen in FIG. 15. Also when the attachment members 16 are located at upper areas of the first portions 30 of the side walls 22, the tie-down devices 18 are preferably moved closer to the floor 20. Preferably, the tie-down devices 18 are spaced about 100 millimeters from the floor 20 for low profile cargo and located midway along the first portions 30 of the side walls 22 for higher profile cargo. Thus, preferably, the tie-down devices 18 are removably and reattachably mounted to the first portions 30 of the side walls 22 so that the location of the tie-down devices 18 can be adjusted or the tie-down devices 18 can be removed when not in use.

Figure 13:
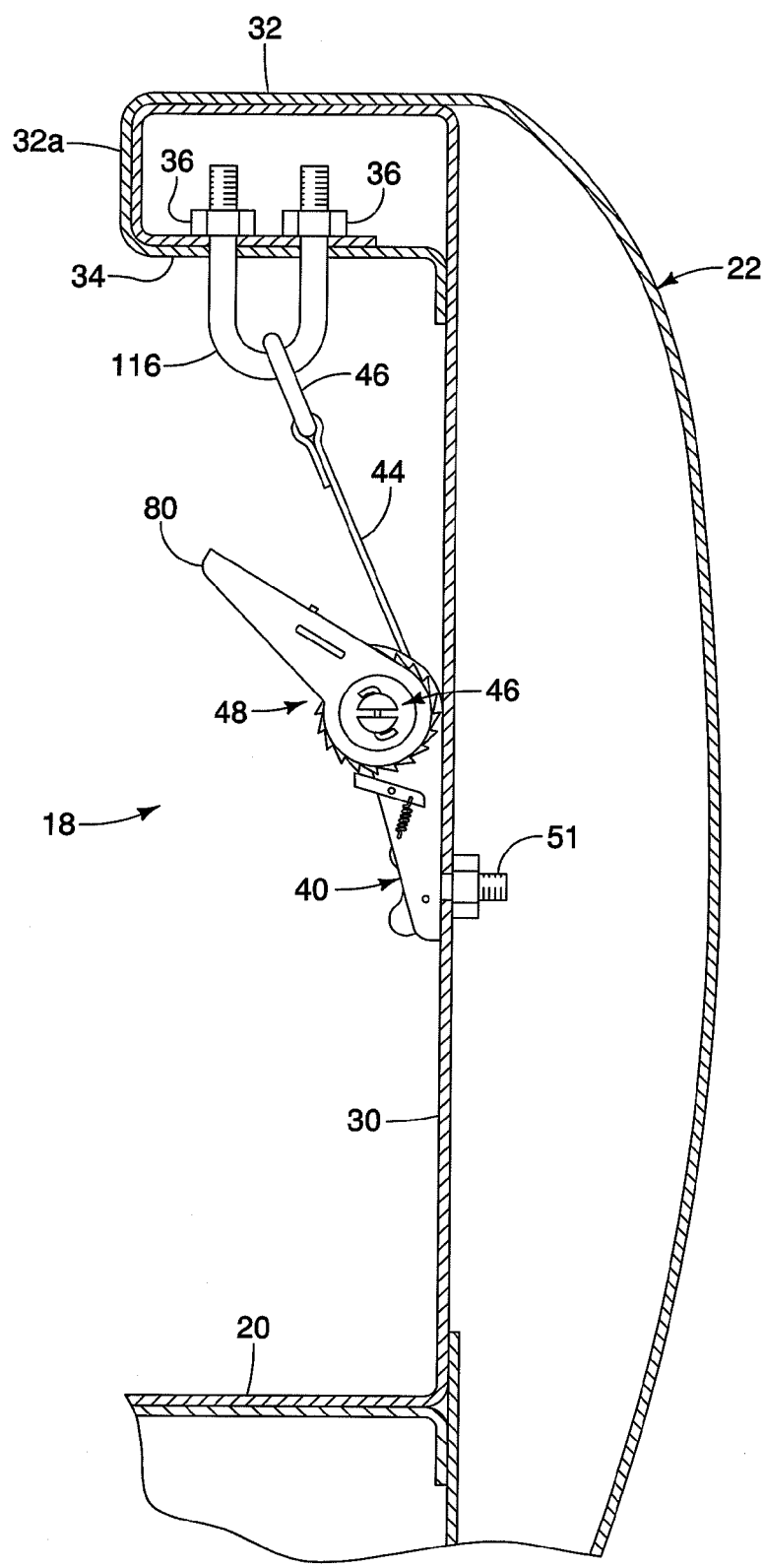
FIG. 13 is a partial cross-sectional view, similar to FIG. 5, of a cargo bed storage structure in accordance with a modified embodiment.
Figure 14:
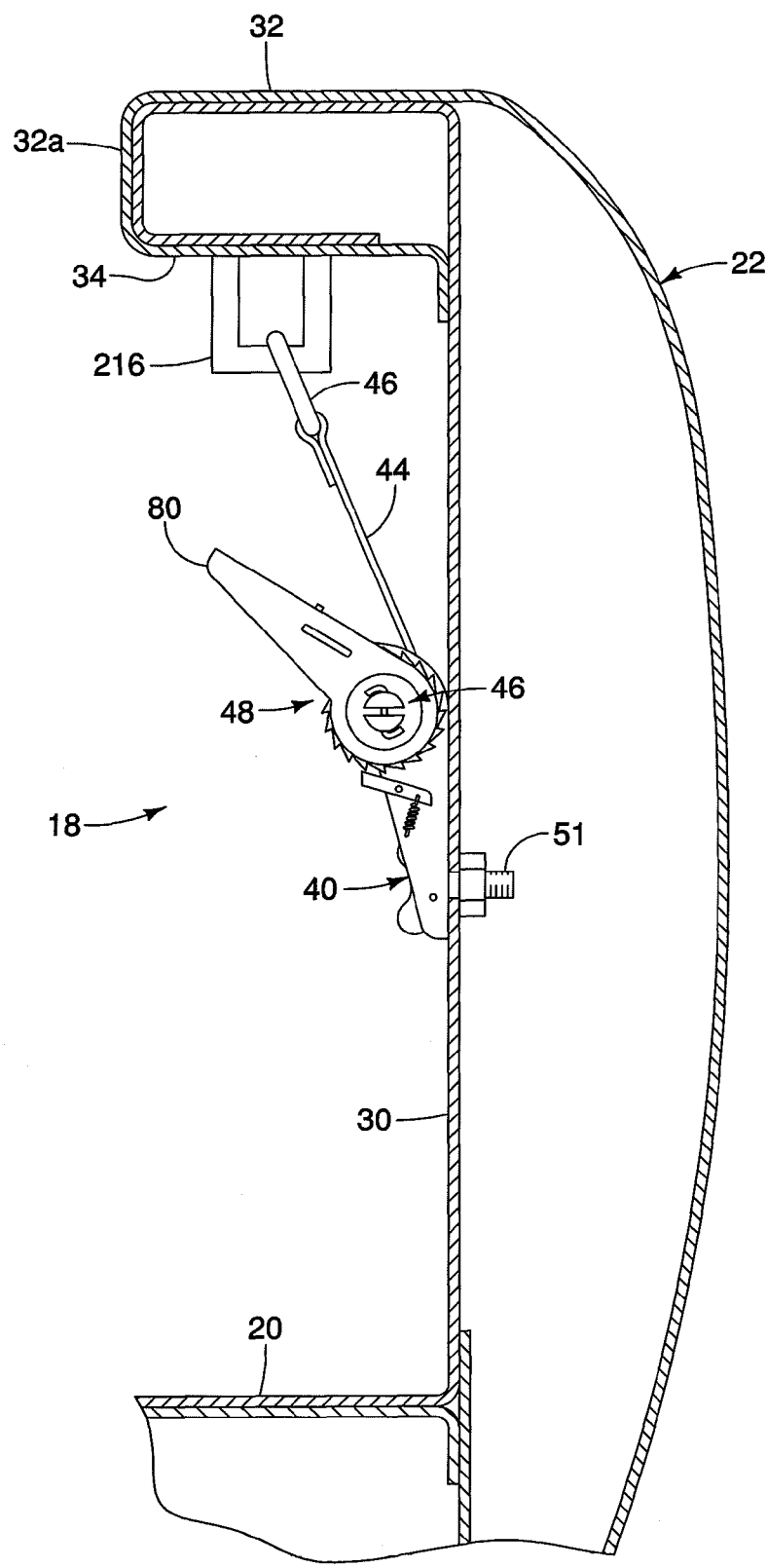
FIG. 14 is a partial cross-sectional view, similar to FIG. 5, of a cargo bed storage structure in accordance with another modified embodiment.

Other examples of attachment members are shown in FIGS. 13 and 14. In particular, in FIG. 13, each of the lower surfaces 34 of the second portions 32 of the side walls 22 includes two attachment members 116 in the form of rigid U-bolts. In FIG. 14, each of the lower surfaces 34 of the second portions 32 of the side walls 22 includes two attachment members 216 in the form of window type openings in portions of the sheet metal forming the side walls 22. Thus, the attachment members 116 and 216, shown in FIGS. 13 and 14, are generally rings for stowing the tie-down devices 18 as discussed below. While in the illustrated embodiment, the attachment members 16, 116 or 216 are all identical, it will be apparent to those skilled in the art from this disclosure that different types of attachment members can be used together on a single cargo bed, as needed and/or desired.

Referring now to FIGS. 5 to 12, the tie-down devices 18 will now be discussed in more detail. In the illustrated embodiment, the tie-down devices 18 are all identical. Thus, only one of the tie-down devices 18 will be discussed and or illustrated in detail herein. Of course, it will be apparent to those skilled in the art from this disclosure that different types of tie-down devices can be used together on a single cargo bed, as needed and/or desired.

Figure 4:
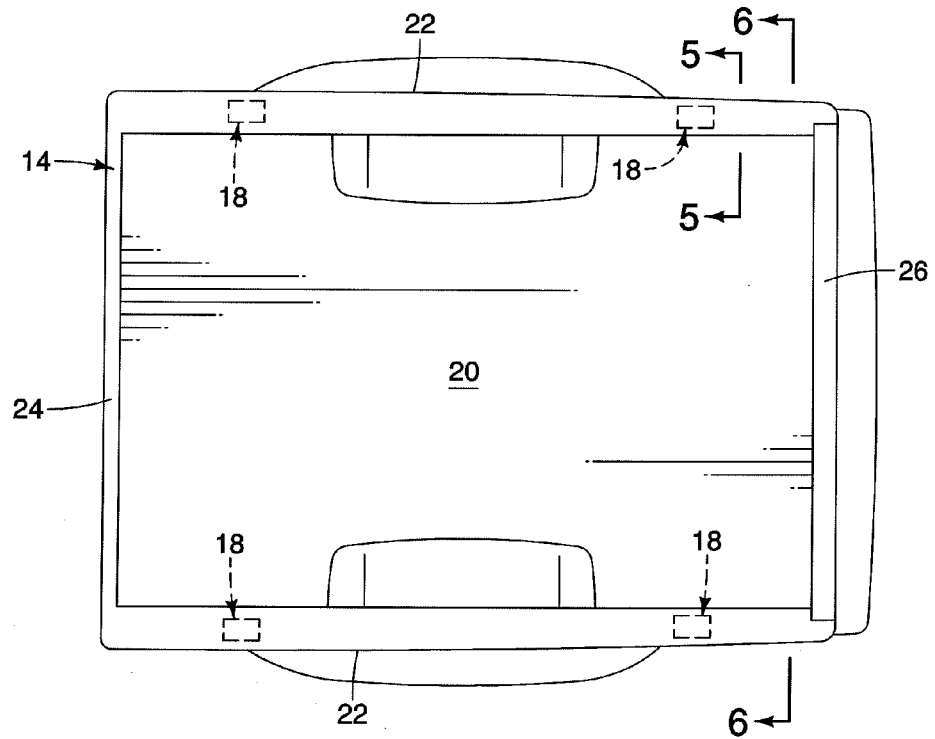
FIG. 4 is a top plan view of the vehicle illustrated in FIGS. 1 to 3 showing the retractable tie-downs of the cargo bed storage structure disposed entirely outboard of an inboard distal end of the horizontal ledge portion of the wall forming the cargo bed so that the retractable tie-downs are hidden from a plan view taken from above the cargo bed.

Generally speaking, tie-down devices such as the tie-down device 18, are well known in the art. Thus, the tie-down device 18 will not be discussed in great detail herein. Rather, the following description will focus on the differences between conventional tie-down devices and the tie-down device 18, and location of the tie-down devices 18 with respect to the second portions 32 of the side walls 22. The tie-down devices 18 are self-retracting devices. The tie-down devices 18 are each operative in a stowed configuration and a usage configuration. The tie-down devices 18 allow for unrestricted movement of cargo on the cargo bed when the tie-down devices 18 are in the stowed configuration. In particular, a cargo area of the cargo bed 14 is defined by the space between the inboard distal ends 32a of the second portions 32 of the side walls 22 and the space between the front wall 24 and the tailgate 26. The tie-down devices 18 are disposed at a location that is spaced entirely above the floor 20 for unrestricted movement of cargo on the floor 20 of the cargo bed 14 when the tie-down devices 18 are in the stowed configurations. Preferably, the tie-down devices 18 are also disposed entirely below the second portions 32 of the side walls 22 such that the tie-down devices 18 are hidden from a plan view taken from above the cargo bed 14 as seen in FIG. 4.

Figure 6:
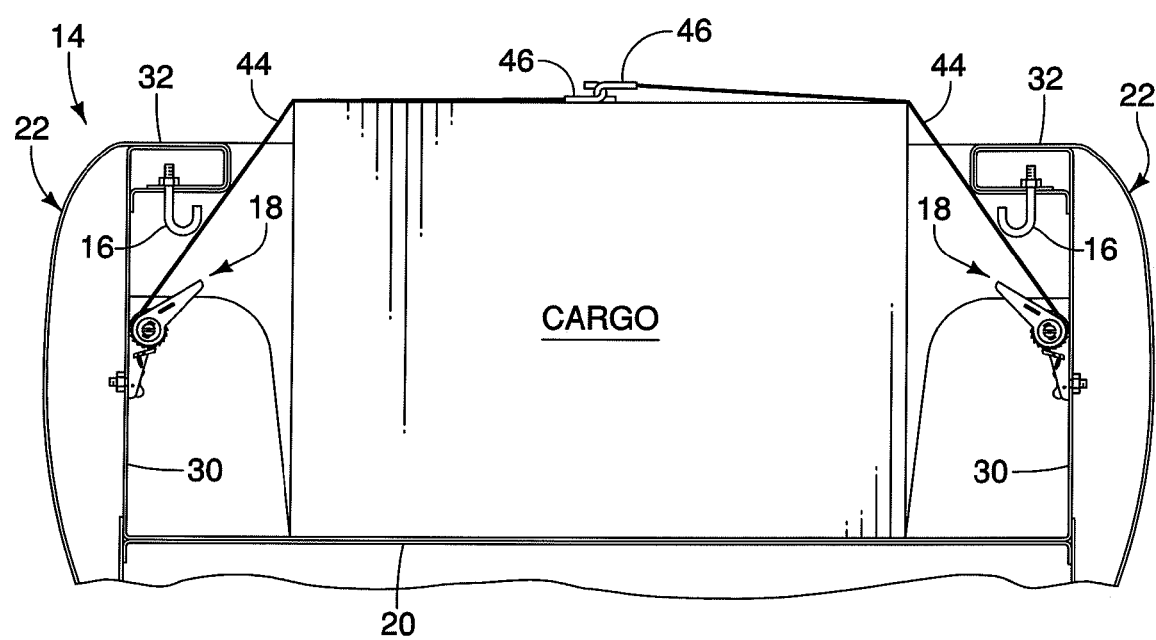
FIG. 6 is a partial cross-sectional view of the cargo bed storage structure as viewed along section line 6-6 of FIG. 4, showing two of the retractable tie-downs in the usage configuration.
Figure 7:
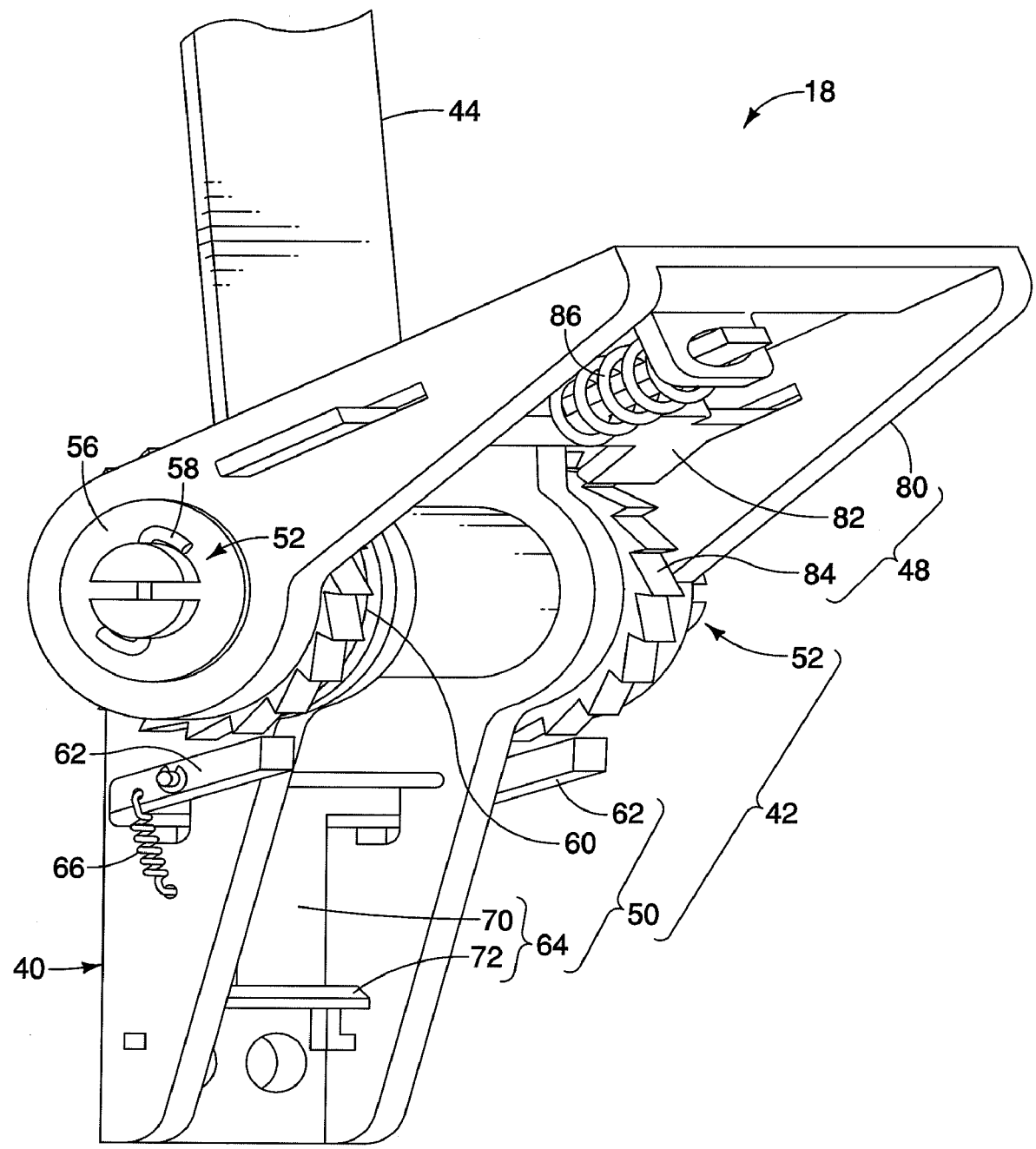
FIG. 7 is a perspective view of one of the retractable tie-downs for the cargo bed storage structure.
Figure 8:
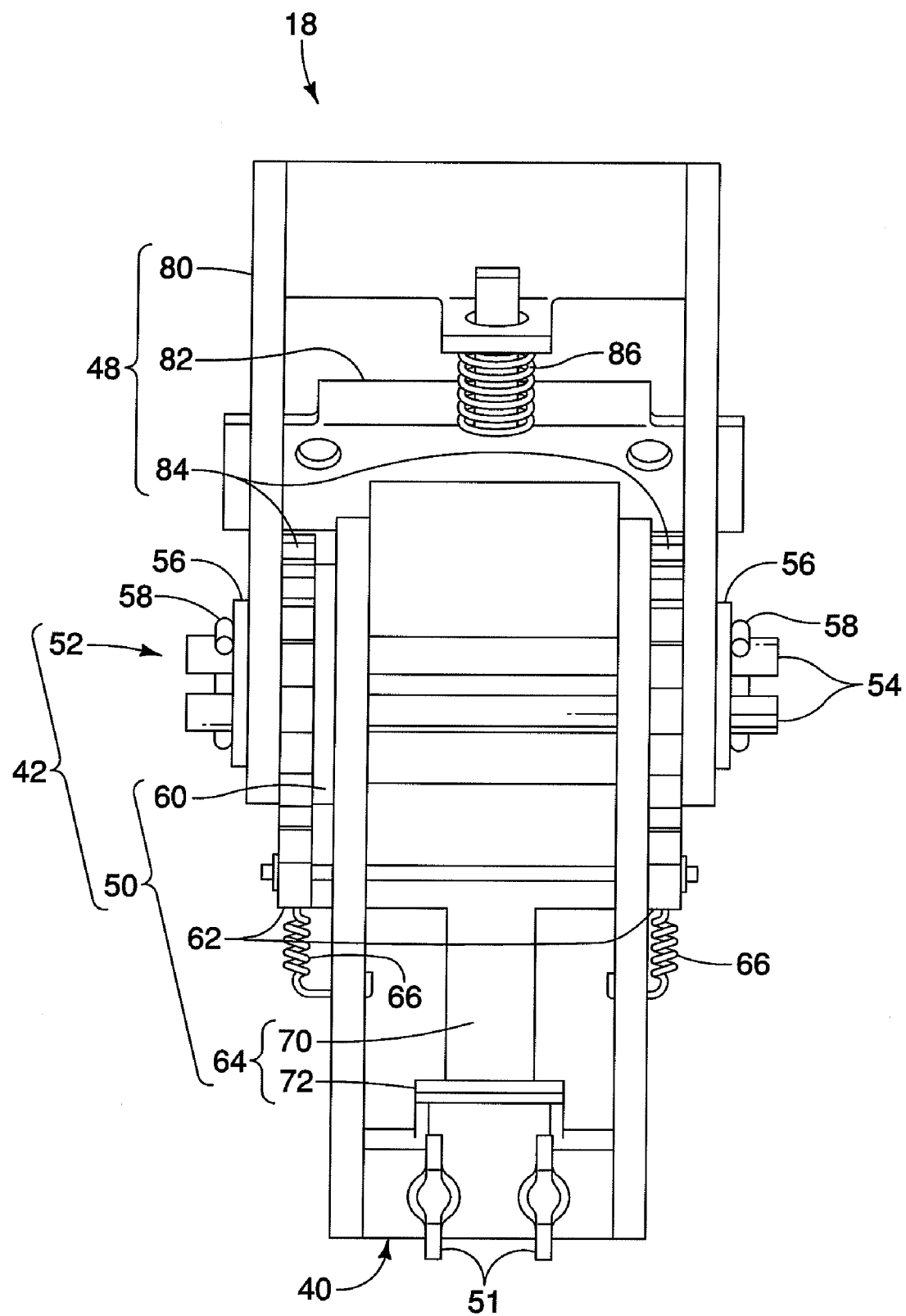
FIG. 8 is an elevational view of one of the retractable tie-downs for the cargo bed storage structure.
Figure 9:
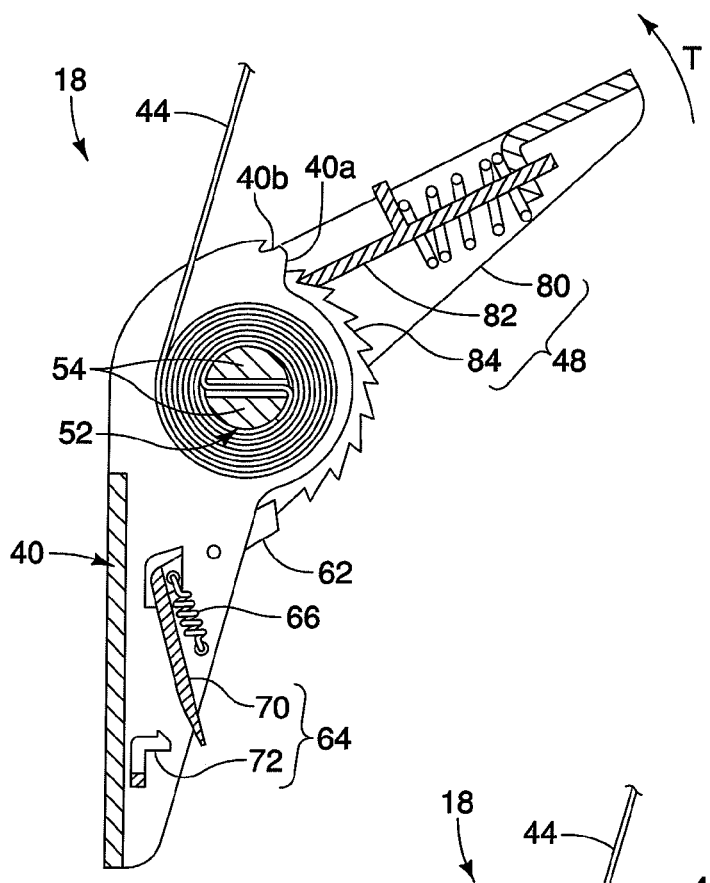
FIG. 9 is a cross-sectional view of one of the retractable tie-downs for the cargo bed storage structure, which shows the retractable tie-down in a cinching position.
Figure 10:
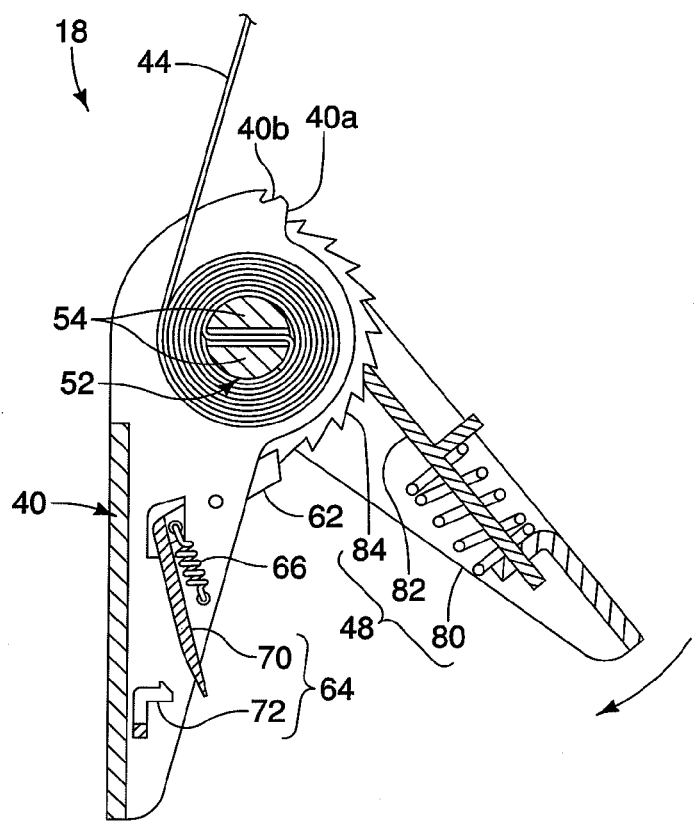
FIG. 10 is a cross-sectional view of one of the retractable tie-downs for the cargo bed storage structure, which shows the retractable tie-down in a ratcheting position.
Figure 11:
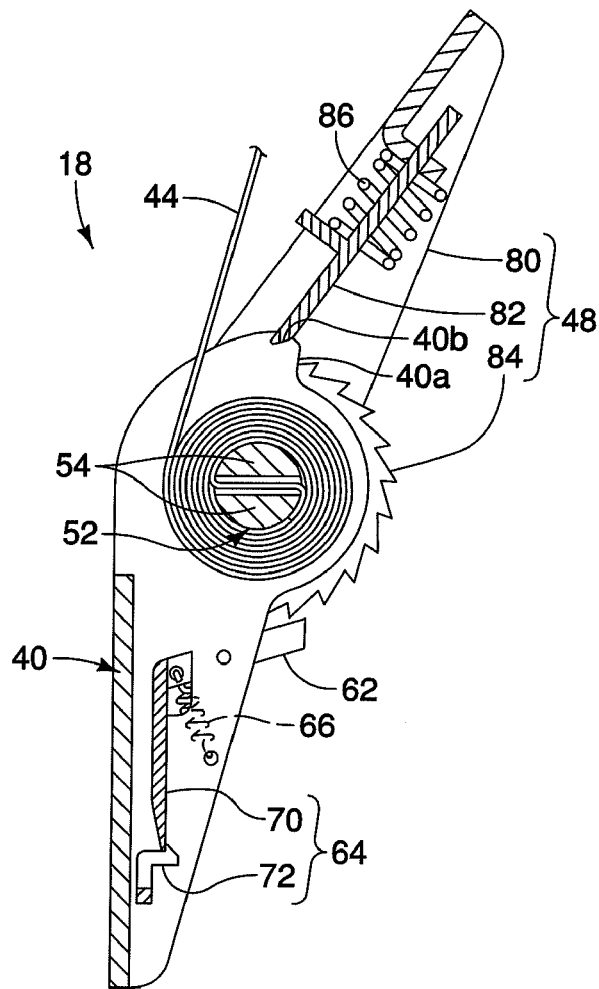
FIG. 11 is a cross-sectional view of one of the retractable tie-downs for the cargo bed storage structure, which shows the retractable tie-down in a release position.
Figure 12:
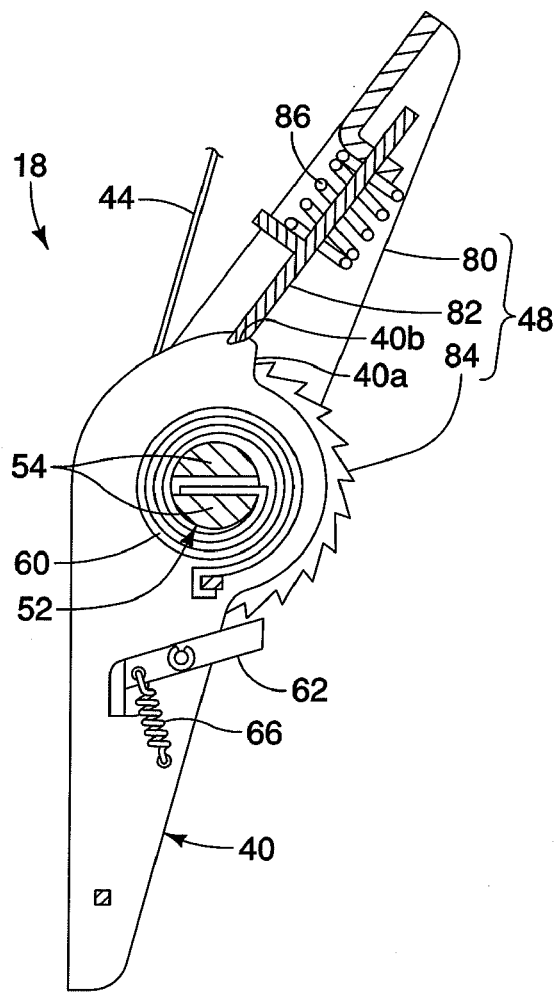
FIG. 12 is a cross-sectional view of one of the retractable tie-downs for the cargo bed storage structure, which shows the return spring of the retractable tie-down.

Basically, each of the tie-down devices 18 includes a U-shaped anchoring part 40, a retracting part 42, a tether 44, an engagement part 46 and a cinching mechanism 48. The anchoring part 40 is fixed to one of the first portions 30 of the side walls 22. The retracting part 42 is coupled to the anchoring part 40. The retracting part 42 is attached to an end of the tether 44 for retracting and releasing the tether 44 with respect to the anchoring part 40. The tether 44 is a strap in the illustrated embodiment. However, other types of tethers can be used. Preferably, a self-retracting mechanism 50 is built into the retracting part 42 such that that the self-retracting mechanism 50 biases the tether 44 to a retracted position. The engagement part 46 is attached to the other end of the tether 44 in a releasable manner for engaging one of the attachment members 16 when the tie-down device 18 is in the stowed configuration as seen in FIG. 5. The cinching mechanism 48 is operable to tension the tether 44 between the retracting part 42 and the engagement part 46 when the tie-down device 18 is in the stowed configuration as seen in FIG. 5. Also the cinching mechanism 48 is operable to tension the tether 44 between the retracting part 42 and the engagement part 46 when the tie-down device 18 is in the usage configuration as seen in FIG. 6. While the usage configuration shown in FIG. 6 is a case in which the engagement parts 46 (e.g., hooks) are hooked together, the usage configuration is not limited to this illustrated example. For example, in another usage configuration, the engagement part 46 of one of the tie-down devices 18 can be hooked onto the attachment members 16 associated with another one of the tie-down devices 18 that is on the opposite side of the cargo bed 14.

While the tie-down devices 18, in the illustrated embodiment, are shown with the cinching mechanism 48 for tightening the tether 44, the cinching mechanism 48 can be eliminated and just use the self-retracting mechanism 50. In other words, in cases of light loads, the self-retracting mechanism 50 would apply tension to the tether 44 for holding the load in place.

In this illustrated embodiment, the anchoring part 40 constitutes a first end of the tie-down device 18, while the engagement part 46 constitutes a second end of the tie-down device 18. Thus, the first end (i.e., the anchoring part 40) of the tie-down device 18 is fixed to one of the first portions 30 of the side walls 22, while the second end (i.e., the engagement part 46) of the tie-down device 18 is releasably engaged with one of the attachment members 16 when the tie-down device 18 is in the stowed configuration such that the tie-down device 18 is disposed entirely outboard of the inboard distal end 32a of the corresponding one of the second portions 32 of the side walls 22.

The anchoring part 40 is a hard, rigid member that is formed from a suitable hard, rigid material such as metal or resin. The anchoring part 40 is fixed to one of the first portions 30 of the side walls 22 by a pair of fasteners such as thumb screws 51. By using thumb screws 51, the locations of the tie-down devices 18 above the floor 20 can easily adjusted without tools. Thus, the thumb screws 51 constitute toolless connections of the tie-down devices 18. Of course, it will be apparent to those skilled in the art from this disclosure that different types of fasteners can be used such as bolts, welds, rivets, adhesive or clips. The anchoring part 40 (i.e., the first end) of the tie-down device 18 is fixed to the first portion 30 of the side wall 22 either at approximately a vertical midpoint of the first portion 30 of the side wall 22 for high profile cargo or about 100 millimeters above the floor for low profile cargo. In this way, the tie-down device 18 avoids interfering with cargo on the floor 20.

The retracting part 42 preferably includes a winding shaft 52 that is rotatably mounted on the anchoring part 40. The winding shaft 52 is formed of a pair of semi-circular bars 54 that are held together by a pair of washers 56 and a pair of bent pins 58. The bars 54 form a slot for attaching one end of the tether 44 thereto. Thus, as the winding shaft 52 is rotated, the tether 44 is wound or unwound on the winding shaft 52.

As mentioned above, the retracting part 42 preferably includes the self-retracting mechanism 50, which applies tension to the tether 44 for retracting the tether 44 on the winding shaft 52. The self-retracting mechanism 50 basically includes a return spring 60, a pair of locking members or plates 62 and a lock release switch 64. The return spring 60 has one end looped onto one of the semi-circular bars 54 and the other end looped on a projection of the anchoring part 40 so that the return spring 60 biases the tether 44 to a retracted position. The locking members 62 are pivotally mounted to the anchoring part 40 for movement between a locking position and a release position. Two springs 66 are provided for biasing the locking members 62 towards the locking position.

In this embodiment, the lock release switch 64 has an operating member 70 and a catch 72. The operating member 70 is attached to the locking members 62 to move therewith. In particular, when the operating member 70 is depressed towards the anchoring part 40, the locking members 62 are moved from the locking position to the release position. The catch 72 is a resilient member that is fixed to the anchoring part 40. When the operating member 70 is depressed towards the anchoring part 40, the catch 72 engages the free end of the operating member 70 to hold the operating member 70 in the release position. The operating member 70 can be released by pivoting the catch 72 away from the operating member 70 so that the locking members 62 move back to the locking position.

In the illustrated embodiment, the engagement part 46 is a hook that is made from metal or a hard resin. If the engagement part 46 is made from metal, then preferably, the engagement part 46 is coated for corrosion protection. Of course, it will be apparent to those skilled in the art from this disclosure that the engagement part 46 can have different types of configurations, as needed and/or desired. In any event, the engagement part 46 is fastened to the end of the tether 44 that is remote from the retracting part 42.

The cinching mechanism 48 basically includes a U-shaped tensioning lever 80, a ratchet plate 82 and a pair of ratchet wheels 84. The tensioning lever 80 is pivotally mounted to the winding shaft 52 for tightening the tether 44. The ratchet plate 82 is slidably coupled to the tensioning lever 80 and biased by a compression spring 86 towards the teeth of the ratchet wheels 84. The ratchet wheels 84 are non-rotatably fixed to the winding shaft 52 such that the winding shaft 52 and the ratchet wheels 84 rotate together as a unit. Thus, when the tensioning lever 80 is pivoted in a tightening direction T (e.g., a counter clockwise direction in FIG. 9), the ratchet plate 82 engages the teeth of the ratchet wheels 84 to rotate the winding shaft 52 and the ratchet wheels 84. This rotation of the winding shaft 52 causes the tether 44 to be wound upon the winding shaft 52. When the tensioning lever 80 is pivoted in the opposite direction (e.g., a clockwise direction in FIG. 10), the ratchet plate 82 ratchets over the teeth of the ratchet wheels 84, while the locking members 62 prevent the winding shaft 52 and the ratchet wheels 84 from rotating. Preferably, the anchoring part 40 is provided with a pair of cam surfaces 40a and a pair of retaining notches 40b. If the tensioning lever 80 is pivoted upwardly in the tightening direction T such that the ratchet plate 82 engages the cam surfaces 40a, then the ratchet plate 82 is moved out of engagement from the teeth of the ratchet wheels 84. Thus, when the tensioning lever 80 is pivoted upwardly in the tightening direction T such that the ratchet plate 82 engages retaining notches 40b, the ratchet plate 82 is completely disengaged so that the lock release switch 64 can be operated to move the locking members 62 from engagement with the teeth of the ratchet wheels 84. In other words, depressing the operating member 70 towards the anchoring part 40 causes the locking members 62 to release the ratchet wheels 84 such that the return spring 60 biases the tether 44 to a retracted position.

GENERAL INTERPRETATION OF TERMS

In understanding the scope of the present invention, the term "comprising" and its derivatives, as used herein, are intended to be open ended terms that specify the presence of the stated features, elements, components, and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle having a cargo bed storage structure. Accordingly, these terms, as utilized to describe the cargo bed storage structure, should be interpreted relative to a vehicle having a cargo bed storage structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size or shape of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cargo bed storage structure for a vehicle, comprising:
a cargo bed including a floor, and a wall with the wall having a first portion extending substantially perpendicularly from the floor and a second portion extending inboard from the first portion and defining a lower surface facing the floor;
an attachment member fixed to the lower surface of the second portion of the wall; and
a tie-down device having a first end and a second end with the first end being fixed to the first portion of the wall, the tie-down device operative in a stowed configuration and a usage configuration,
the second end of the tie-down device being releasably engaged with the attachment member when the tie-down device is in the stowed configuration such that the tie-down device is disposed entirely outboard of an inboard distal end of the second portion of the wall.

2. The cargo bed storage structure according to claim 1, wherein
the tie-down device is a self-retracting device.

3. The cargo bed storage structure according to claim 1, wherein
the tie-down device further includes a retracting part and a tether retractably coupled to the retracting part,
the first end of the tie-down device includes an anchoring part with the anchoring part being fixed to the first portion of the wall and supporting the retracting part,
the second end of the tie-down device includes an engagement part that is attached to the tether and releasably engages the attachment member when the tie-down device is in the stowed configuration.

4. The cargo bed storage structure according to claim 1, wherein
the cargo bed defines a pick-up truck bed.

5. The cargo bed storage structure according to claim 1, wherein
the tie-down device is disposed at a location that is spaced entirely above the floor for unrestricted movement of cargo on the floor of the cargo bed when the tie-down device is in the stowed configuration.

6. The cargo bed storage structure according to claim 1, wherein
the first end of the tie-down device is fixed to the first portion of the wall at approximately a vertical mid-point of the first portion of the wall.

7. The cargo bed storage structure according to claim 3, wherein
the retracting part of the tie-down device includes a self-retracting mechanism that biases the tether to a retracted position.

8. The cargo bed storage structure according to claim 3, wherein
the tie-down device further includes a cinching mechanism operable to tension the tether between the retracting part and the engagement part when the tie-down device is in the usage configuration.

9. The cargo bed storage structure according to claim 8, wherein
the cinching mechanism is operable to tension the tether between the retracting part and the engagement part when the tie-down device is in the stowed configuration.

10. The cargo bed storage structure according to claim 1, wherein
at least one of the attachment member and the second end of the tie-down device includes a hook.

11. The cargo bed storage structure according to claim 1, wherein
the attachment member includes a ring.

12. The cargo bed storage structure according to claim 1, wherein
the tie-down device is disposed entirely below the second portion of the wall such that the tie-down device is hidden from a plan view taken from above the cargo bed.

13. The cargo bed storage structure according to claim 1, wherein
the first end of the tie-down device is removably and reattachably mounted to the first portion of the wall.

* * * * *